Patented Aug. 26, 1941

2,254,187

UNITED STATES PATENT OFFICE 2,254,187

TOOL FOR SEGMENTING CITRUS FRUITS

Ralph Polk, Sr., Miami, and Ralph Polk, Jr., Haines City, Fla., assignors to The Polk Development Company, Tampa, Fla., a copartnership of Florida Original application April 13, 1938, Serial No. 201,732. Divided and this application June 7, 1939, Serial No. 277,846

3 Claims. (Cl. 146—3)

This application is a division from our application Serial No. 201,732, filed April 13, 1938, which has matured into Patent 2,199,345, granted April 30, 1940, and relates to that portion of the invention which is illustrated in Fig. 7 of that application.

In order to can the meats of citrus fruits, it is necessary to segregate the juice-cell groups, substantially whole, from the radially extending integument portions which envelope them.

To facilitate this separation, we have provided the tool forming the subject matter of the present application.

The accompanying drawings illustrate an embodiment of our invention.

Figure 1:
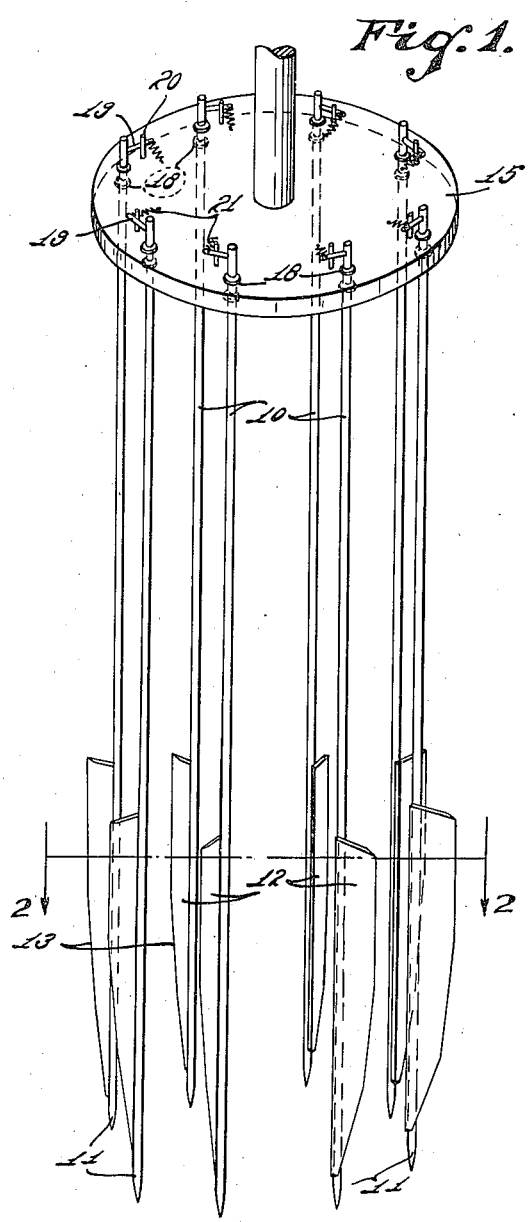
Fig. 1 is a perspective view of a circular view of our improved tools.

In the drawings 10 indicates a slender, somewhat resilient, stem, conveniently a round rod, of a length about twice the polar diameter of fruit to be acted upon and tapered at its lower end 11. Tangentially attached to stem 10, in its lower length, is a thin, upwardly tapered blade 12 having its tapered edge 13 preferably, though not necessarily, slightly sharpened around it. The blade 12 has a length somewhat greater than half the polar diameter of the fruit to be acted upon and a maximum width slightly greater than the radial extent of a juice-cell group of the fruit to be acted upon, and the lower end of the blade 12 is arranged just above the tapered lower end of the stem 10.

Several of these tools, conveniently about half the average number of segments in the fruit to be acted upon, are journaled in a head 15 upon parallel axes in a circumferentially spaced circular series, the diameter of which is such that the tips 11 may be caused to simultaneously penetrate a peeled fruit, each tip 11 entering the apex of a juice-cell group within the apex of the V-shaped enveloping integument. The stems 11 are somewhat loosely journaled in disc 15 and are held against axial displacement by suitable collars 13. Each of the stems 10 is provided, at its upper end, with a laterally projecting arm 19 normally biased toward and against a stop pin 20 by a light spring 21.

The peeled fruit, from which the major portion of the circumferential portions of the enveloping integuments, have been preferably removed, is conveniently supported upon a fork composed of a circular series of parallel tines arranged around a central axis at a radial distance such that the tines will enter the fruit polarwise closely within the apices of the V-shaped integuments but just outside of the roots of those integuments, thus serving not only to support the fruit but to hold the V-shaped integuments against outward displacement. The stems 10 are arranged on a slightly larger radius so that they will enter the fruit just radially outside of the tines of the holding fork and, as the group of tools is projected polarwise through the fruit, each blade 12 will automatically adjust itself in the bonding plane between one side of a juice-cell group and its adherent radially extending integument and, because of the tapered form of blade and upwardly and outwardly inclined relation of its outer edge, will shear one face of a juice-cell group from its adherent integument, the springs 21 serving to permit automatic adjustment of the blades relative to the bonding planes. If complete severance of juice-cell groups from the integuments is to be attained by tools of this type, a similar group of tools with their blades 12 set upon the opposite sides of the stems 10 may be used, or some of the blades may be set tangentially upon one side of their stems 10 while other blades in the same circular group may be set on the opposite sides of their stems.

As we have pointed out in our original specification, a fruit in which the bonds between the radial integuments and only one face of each juice-cell group may be further treated by centrifugal action or by a rubbing action of a series of pins concentric with the pins of the holding form, may be manipulated to completely free the juice-cell groups from the integuments.

Figure 2:
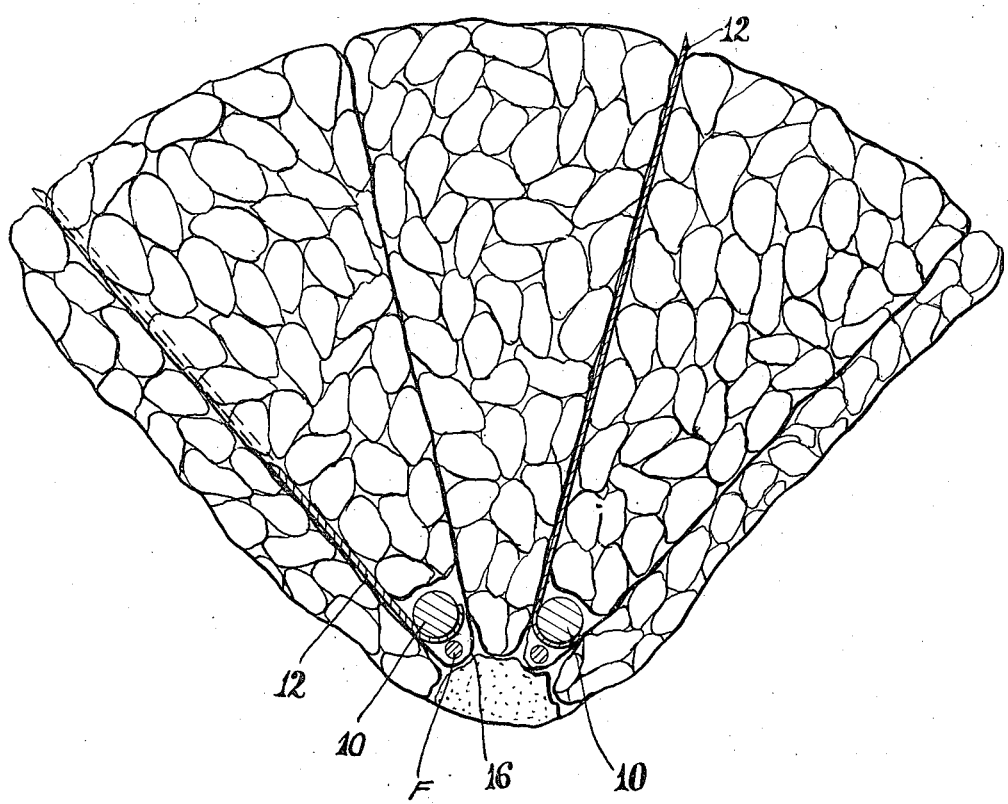
Fig. 2 is a fragmentary horizontal section, on line 2—2 of Fig. 1, showing a portion of a peeled citrus fruit into which our tools have been projected.

The peeled fruit is conveniently held upon a fork comprised of a circular series of small tines F (Fig. 2), which are projected into the apices of the integuments 16 and the pins 10 are then projected into the fruit from the opposite end within the apices 16 just outside of the holding fork tines F and, as the pins 10 are moved through the fruit, the blades 12 adjust themselves against the flanking radial integument of the juice-cell group into which the blade is projected and thus serve to strip this integument from the juice-cell group, the stripped integument adhering to the adjacent integument of the adjacent juice-cell group.

We claim as our invention:

1. A tool for rupturing the natural-bond between one side of a juice-cell group of a fruit of the citrus type and the adherent radial integument, comprising a straight main stem having a tapered tip and a diameter permitting its projection polarwise through the apex of a fruit segment without rupture of the radial integuments, and a longitudinally-tapered thin blade fixed upon the stem above the tapered tip and substantially tangential to the stem, and a carrier in which the upper end of said stem is loosely journalled, and means for yieldingly urging said stem rotatively to a limit of rotative movement in one direction in said carrier.

2. A tool for rupturing the natural bond between one side of a juice-cell group of a fruit of the citrus type, comprising a circumferential series of straight stems each having a tapered lower end, and a tapered blade arranged tangentially of the stem above the tapered tip, a carrying head in which the upper ends of the several stems are loosely journalled and suspended, means for limiting rotative movement of the stems in one direction in said head, and means for yieldingly rotating said stems to the limiting means.

3. A tool of the character specified in claim 1, wherein there are a plurality of blade-carrying stems arranged in a circumferential series in position to simultaneously enter and act upon a peeled citrus fruit.

RALPH POLK, Sr.
RALPH POLK, Jr.